US012602162B2

(12) United States Patent
Willey

(10) Patent No.: US 12,602,162 B2
(45) Date of Patent: Apr. 14, 2026

(54) MEMORY TRAINING ENHANCEMENTS

(71) Applicant: Advanced Micro Devices, Inc., Santa Clara, CA (US)

(72) Inventor: Aaron D Willey, Hayward, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 265 days.

(21) Appl. No.: 18/129,300

(22) Filed: Mar. 31, 2023

(65) Prior Publication Data

US 2024/0329838 A1 Oct. 3, 2024

(51) Int. Cl.
 *G06F 3/06* (2006.01)
 *G06F 1/12* (2006.01)
(52) U.S. Cl.
 CPC .............. *G06F 3/0611* (2013.01); *G06F 1/12* (2013.01); *G06F 3/0634* (2013.01); *G06F 3/0653* (2013.01); *G06F 3/0659* (2013.01); *G06F 3/0673* (2013.01)
(58) Field of Classification Search
 CPC ........ G06F 3/0611; G06F 1/12; G06F 3/0634; G06F 3/0653; G06F 3/0659; G06F 3/0673; G06F 1/3275
 USPC .......................................................... 365/226
 See application file for complete search history.

(56) References Cited

U.S. PATENT DOCUMENTS

| 5,796,992 | A | 8/1998 | Reif et al. | |
| 8,593,897 | B2 | 11/2013 | Kato et al. | |
| 9,274,938 | B2 | 3/2016 | Searles et al. | |
| 11,093,166 | B2 * | 8/2021 | Kim ..................... | G06F 3/0616 |
| 11,157,201 | B2 | 10/2021 | Kim et al. | |
| 2014/0032947 | A1 | 1/2014 | Ahmad et al. | |
| 2022/0076729 | A1 * | 3/2022 | Choi ........................ | G11C 7/04 |
| 2023/0393776 | A1 * | 12/2023 | Zhou ..................... | G06F 3/0679 |

OTHER PUBLICATIONS

International Search Report and Written Opinion for International Application No. PCT/US2024/021903, mailed Jul. 2, 2024, 7 pages.
Jedec Standard; "Low Power Double Date Rate 4 (LPDDR4)"; JESD209-4B (Revision of JESD209-4A, Nov. 2015); Feb. 2017; Jedec Solid State Technology Association; 3103 North 10th Street Suite 240 South, Arlington, VA 22201-2107; 307 pages.

* cited by examiner

*Primary Examiner* — Fernando Hidalgo
(74) *Attorney, Agent, or Firm* — Polansky & Associates, P.L.L.C.; Paul J. Polansky

(57) ABSTRACT

A data processing system includes a data processor having a memory controller, and a memory. The memory is coupled to the memory controller and is for reading and writing data synchronously with respect to a clock signal. The memory includes a sensor circuit that is responsive to a control signal to output a measured value without using the clock signal.

20 Claims, 6 Drawing Sheets

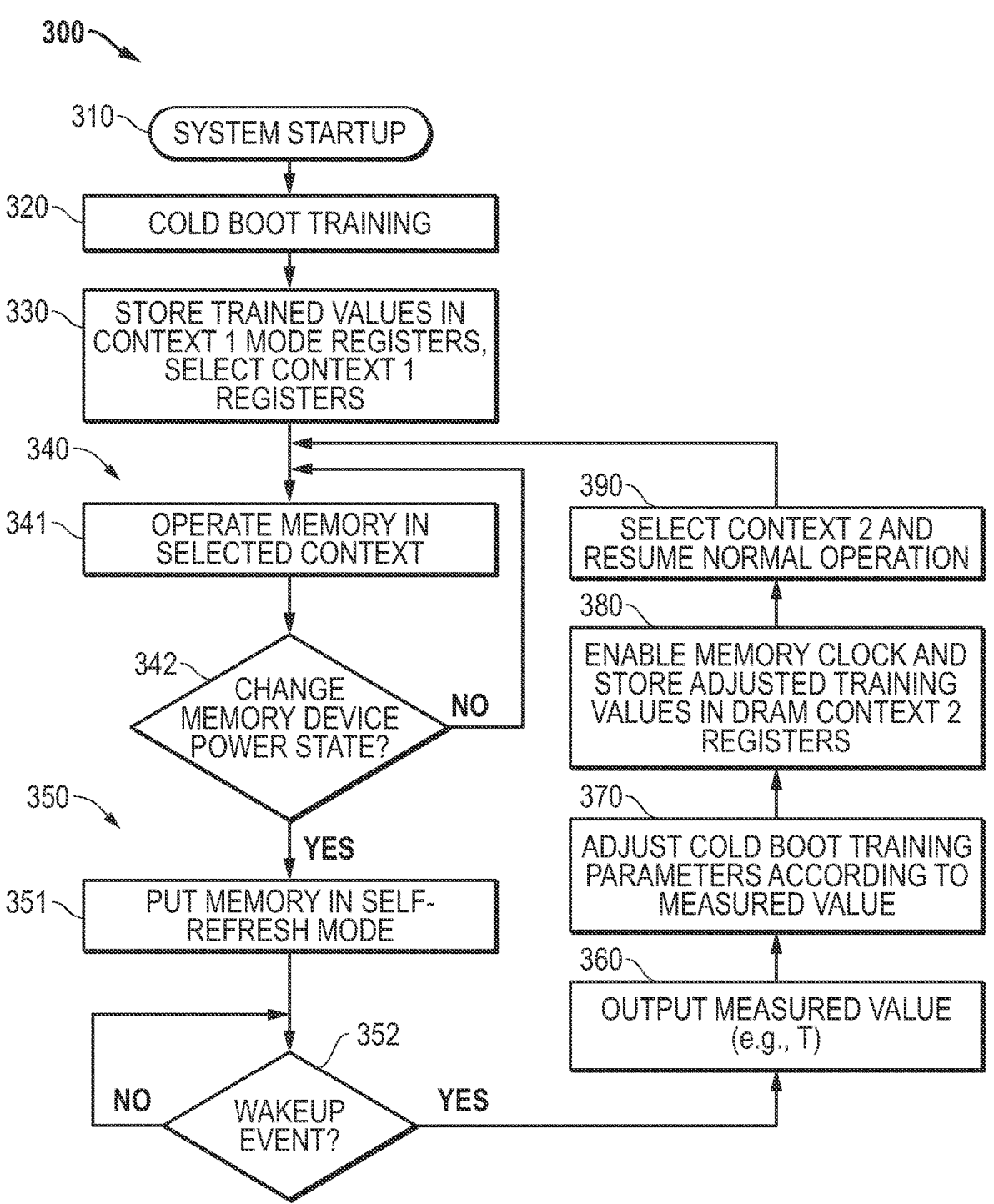

300

310 — SYSTEM STARTUP

320 — COLD BOOT TRAINING

330 — STORE TRAINED VALUES IN CONTEXT 1 MODE REGISTERS, SELECT CONTEXT 1 REGISTERS

340

341 — OPERATE MEMORY IN SELECTED CONTEXT

342 — CHANGE MEMORY DEVICE POWER STATE?

NO

350

YES

351 — PUT MEMORY IN SELF-REFRESH MODE

352 — WAKEUP EVENT?

NO

YES

390 — SELECT CONTEXT 2 AND RESUME NORMAL OPERATION

380 — ENABLE MEMORY CLOCK AND STORE ADJUSTED TRAINING VALUES IN DRAM CONTEXT 2 REGISTERS

370 — ADJUST COLD BOOT TRAINING PARAMETERS ACCORDING TO MEASURED VALUE

360 — OUTPUT MEASURED VALUE (e.g., T)

*FIG. 3*

MEMORY TRAINING ENHANCEMENTS

FIELD

This disclosure relates generally to data processing systems, and more specifically to data processing systems with memory chips that require parameters to be trained for operation.

BACKGROUND

Modern dynamic random access memory such as double data rate (DDR) dynamic random access memories include large arrays of very small dynamic random access memory cells that store charge on very small capacitors. During a memory access, a row of a DDR DRAM is first "activated" by reading contents of the memory cell into a row buffer. Once the contents have been moved into the row buffer, they can be read and written at very high speed, such as on the order of several gigahertz (GHz). When access to another row is desired, the contents of the selected row are rewritten to the memory array with any new data that may have been changed.

BRIEF DESCRIPTION OF THE DRAWINGS

FIG. 3 is a flow chart useful in understanding the operation of the data processing system of FIG. 1 according to some embodiments;

Figure 1:
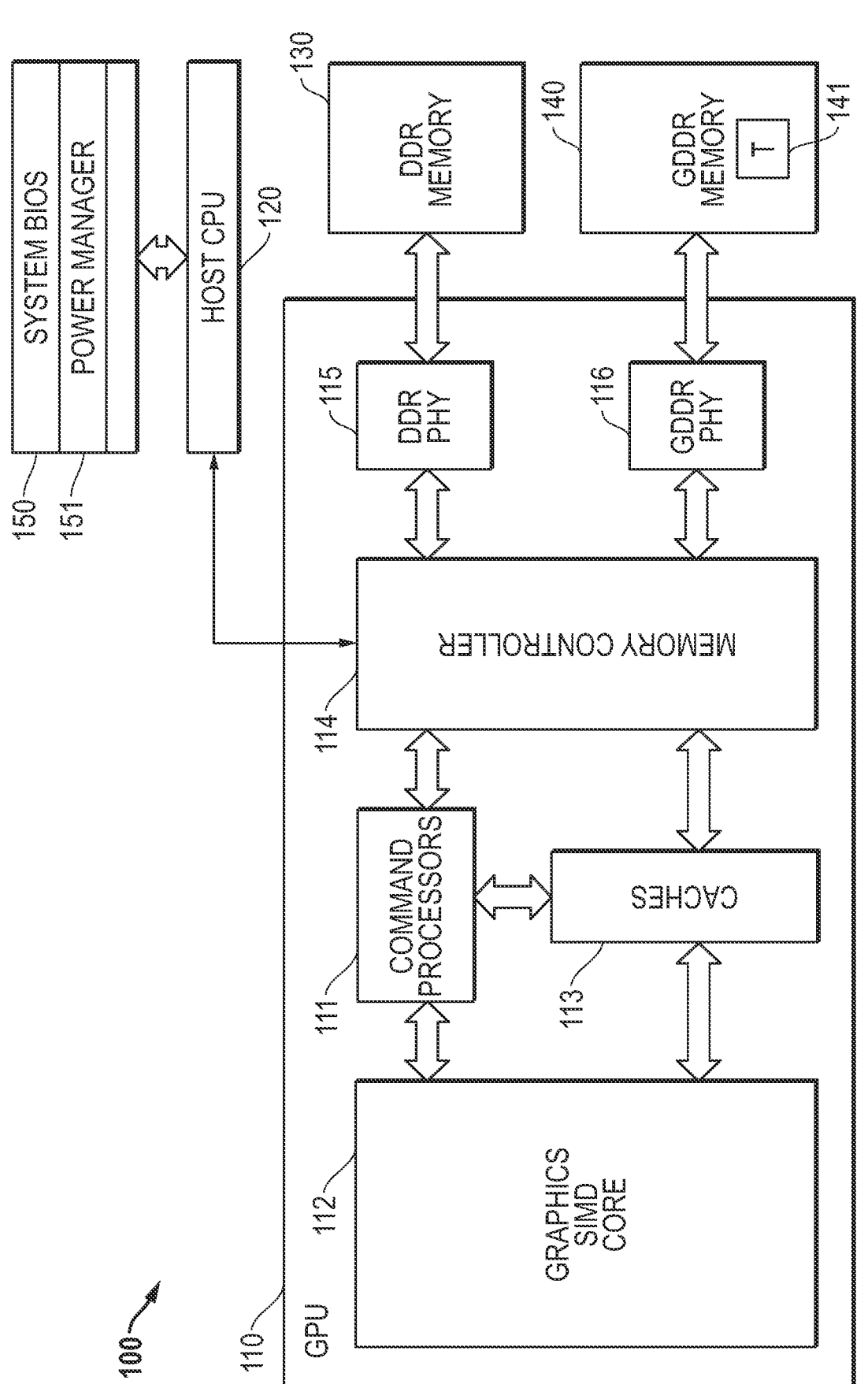
FIG. 1 illustrates in block diagram form a data processing system according to some embodiments.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

A data processing system includes a data processor having a memory controller, and a memory. The memory is coupled to the memory controller and is for reading and writing data synchronously with respect to a clock signal. The memory includes a sensor circuit that is responsive to a control signal to output a measured value without using the clock signal.

A memory includes a control logic circuit, a memory array, access circuitry, and a sensor circuit. The control logic circuit has a first input for receiving a clock signal, a second input for receiving a command signal, and an output for providing a control signal in response to a predetermined state of the second input. The access circuitry is responsive to commands received on the second input synchronously with the clock signal to access data in the memory array. The sensor circuit is for outputting a measured value in response to an activation of the control signal. The control logic circuit (210) is responsive to the predetermined state of the second input to activate the control signal without using the clock signal.

A method includes determining whether a memory will enter a low power mode. The memory is put into the low power mode, and putting the memory into the low power mode includes stopping an external clock from being provided to the memory. A wakeup event is detected. A measured value is sensed using a sensor circuit. A set of cold boot parameters for operating the memory according to the measured value are adjusted to form current parameters. The memory is operated using the current parameters.

FIG. 1 illustrates in block diagram form a data processing system 100 according to some embodiments. Data processing system 100 includes generally a data processor in the form of a graphics processing unit (GPU) 110, a host central processing unit (CPU) 120, a double data rate (DDR) memory 130, and a graphics DDR (GDDR) memory 140.

GPU 110 is a discrete graphics processor that has extremely high performance for optimized graphics processing, rendering, and display, but requires a high memory bandwidth for performing these tasks. GPU 110 includes generally a set of command processors 111, a graphics single instruction, multiple data (SIMD) core 112, a set of caches 113, a memory controller 114, a DDR physical interface circuit (DDR PHY) 115, and a GDDR PHY 116. While a GPU is shown in this implementation, GPU 110 may be one of a variety of data processing elements such as a machine-learning parallel accelerated processor.

Command processors 111 are used to interpret high-level graphics instructions such as those specified in the OpenGL programming language. Command processors 111 have a bidirectional connection to memory controller 114 for receiving high-level graphics instructions such as OpenGL instructions, a bidirectional connection to caches 113, and a bidirectional connection to graphics SIMD core 112. In response to receiving the high-level instructions, command processors issue low-level instructions for rendering, geometric processing, shading, and rasterizing of data, such as frame data, using caches 113 as temporary storage. In response to the graphics instructions, graphics SIMD core 112 performs low-level instructions on a large data set in a massively parallel fashion. Command processors 111 and caches 113 are used for temporary storage of input data and output (e.g., rendered and rasterized) data. Caches 113 also have a bidirectional connection to graphics SIMD core 112, and a bidirectional connection to memory controller 114.

Memory controller 114 has a first upstream bidirectional port connected to command processors 111, a second upstream bidirectional port connected to caches 113, a first downstream bidirectional port to DDR PHY 115, and a second downstream bidirectional port to GDDR PHY 116. As used herein, "upstream" ports are on a side of a circuit toward a data processor and away from a memory, and "downstream" ports are in a direction away from the data processor and toward a memory. Memory controller 114 controls the timing and sequencing of data transfers to and from DDR memory 130 and GDDR memory 140. DDR and GDDR memory have asymmetric accesses, that is, accesses to open pages in the memory are faster than accesses to closed pages. Memory controller 114 stores memory access commands and processes them out-of-order for efficiency by, e.g., favoring accesses to open pages, while observing certain quality-of-service objectives.

DDR PHY 115 has an upstream bidirectional port connected to the first downstream port of memory controller 114, and a downstream port bidirectionally connected to DDR memory 130. DDR PHY 115 meets all specified timing parameters of the version of DDR memory 130, such as DDR version five (DDR5), and performs timing calibration operations at the direction of memory controller 114. Likewise, GDDR PHY 116 has an upstream port connected to the second downstream port of memory controller 114, and a downstream port bidirectionally connected to GDDR memory 140. GDDR PHY 116 meets all specified timing parameters of the version of GDDR memory 140, and performs timing calibration operations at the direction of memory controller 114. GDDR memory 140 includes a sensor circuit 141 that indicates the value of a parameter that affects the operation of the memory that is readable by memory controller 114.

In operation, data processing system 100 can be used as a graphics card or accelerator because of the high bandwidth graphics processing required for graphics applications. Host CPU 120, running an operating system or an application program, sends graphics processing commands to GPU 110 through DDR memory 130, which serves as a unified memory for GPU 110 and host CPU 120. It may send the commands using, for example, as OpenGL commands, or through any other host CPU to GPU interface. OpenGL is a cross-language, cross-platform application programming interface for rendering 2D and 3D vector graphics. Host CPU 120 uses an application programming interface (API) to interact with GPU 110 to provide hardware-accelerated rendering.

Data processing system 100 uses two types of memory. The first type of memory is DDR memory 130, and is accessible by both GPU 110 and host CPU 120. As part of the high performance of graphics SIMD core 112, GPU 110 uses a high-speed graphics double data rate (GDDR) memory.

Because of very high speed operation compared to the propagation times of signals between a memory controller and a host processor, certain electrical parameters are "trained". For example, during a write cycle, the timing of the launch of the write clock signal relative to the data signals from the data processor must be trained so that the data signals arrive at the DRAM chips with adequate setup and hold time relative to the write clock signal. In modern DDR DRAMs with a large number of electrical parameters that must be trained, the training operation consumes a significant amount of time.

In order to save power under various processing conditions, DRAMs can be placed into various operating power states, defined by different frequencies of operation, so that the power consumed by the DRAMs can be reduced during periods of relatively low processing activity. However, the time it takes to retrain all the electrical parameters that must be changed for the new power state would be disruptive to system operation and may cause stalls that would harm user experience. Some systems therefore train parameters for all possible power states when the system is started up before normal operation. However, the parameters change as the system heats up due to operation of the memory chips themselves, making it difficult to provide accurate trained values for all power states without long retraining operations.

Figure 2:
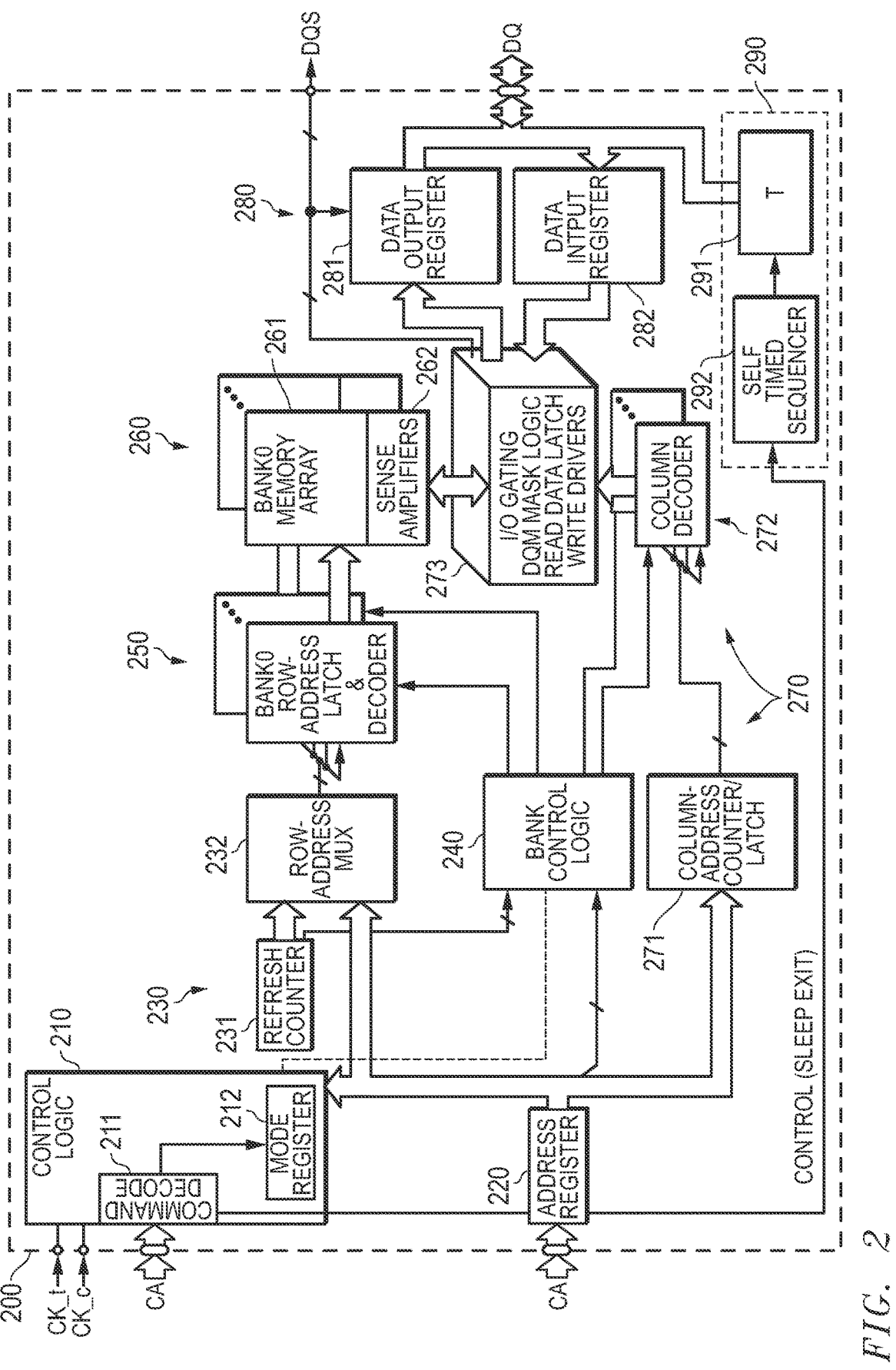
FIG. 2 illustrates in block diagram form a memory for use in the data processing system of FIG. 1 according to some embodiments.

FIG. 2 illustrates in block diagram form a memory 200 for use in data processing system 100 of FIG. 1 according to some embodiments. Memory 200 in an integrated circuit DRAM and includes generally control logic circuit 210, an address register 220, a row address circuit 230, a bank control logic circuit 240, a row address latch and decoder block 250, a memory array 260, a column access circuit 270, a data input/output circuit 280, and a sensor circuit 290.

Control logic circuit 210 has inputs for receiving true and complement clock signals labelled "CK_t" and "CK_c", respectively, a command and address input for receiving a set of command and address signals labelled "CA", and various outputs not shown in FIG. 2. Control logic circuit 210 includes a command decoder 211 and a mode register block 212. Command decoder 211 has an input for receiving the CA signals synchronously with the CK_t and CK_c signals, and output for providing a set of control signals for effectuating the received command. Mode register block 212 includes a set of various mode registers having programmable values that control the operation of memory 200, and an output for providing various mode register settings to other circuits in control logic circuit 210.

Address register 220 has a command and address input for receiving the command and address signals, a clock input (not shown in FIG. 2) for receiving the CK_t and CK_c signals, and an output for providing a latched address to various circuit blocks in memory 200.

Row address circuit 230 includes a refresh counter 231, and a row address multiplexer 232 labelled "MUX". Refresh counter 231 has an output for providing a refresh address, and an output for providing a portion of the refresh address. Row address multiplexer 232 has an input connected to the output of refresh counter 231, and an output for a row address.

Bank control circuit 240 has a first input connected to the second output of refresh counter 231, a second input connected to control logic circuit 210, a third input connected to the output of address register 220, and an output for providing a set of decoded bank select signals.

Row address latch and decoder block 250 includes a set of row latches and decoders for each bank. Each row address latch and decoder has an input connected to the output of row address multiplexer 232, a second input connected to the output of bank control logic circuit 240, and an output for providing a set of decoded row select signals.

Memory array 260 includes a set of memory banks. In the example of DDR5, memory array 260 includes a set of thirty-two memory banks. However, in other embodiments, a different type of memory and a different number of memory banks may be used. Each memory bank has a memory array and a sense amplifiers circuit. As shown in FIG. 2, an exemplary memory bank forming Bank 0 includes a memory array 261 and sense amplifiers 262. Memory array 261 includes a set of rows crossing a set of columns in which memory cells are located at intersections of the rows and columns. Each row receives a corresponding one of the set of row addresses, and when activated, the row outputs a set of data values to sense amplifiers 262, or when precharged, receives a set of data values to be re-written to the memory cells along the selected row.

Column access circuit 270 includes a column address counter/latch 271, a column decoder 272, and an input/output (I/O) gating circuit 273. Column address counter/latch 271 has an input connected to the output of address register 220 for receiving a column address, and an output for providing a current column address. Column decoder 272 includes a set of column decoders for each bank and has an input connected to the output of column address counter/latch 271, a control input for receiving a decoded bank select signal, and an output for providing a set of column select signals. I/O gating circuit 273 has a set of gating circuits for each bank each having an output for providing read data, and an input for receiving write data.

Data input/output circuit 280 includes a data output register 281, and a data input register 282. Data output register 282 has a data input connected to the data output of the I/O gating circuit for each bank, and an output connected to a set of data I/O terminals generically labelled "DQ". Data input register 281 has an input connected to the data I/O terminals, and an output connected to the inputs of the I/O gating circuit for each of the banks.

memory 200 can be, for example, a DDR, version five (DDR5) memory or an enhancement of a graphics DDR, version six (GDDR6) memory. DDR5 memory includes thirty-two banks as well as certain features common to prior DDR memories and certain unique features. Command decoder 211 has been modified from known DDR and GDDR memories to decode a new command known as the "SLEEP EXIT" signal. Decoder outputs a CONTROL signal—the SLEEP EXIT signal—in response to receiving a particular combination of CA signals.

Sensor circuit 290 includes a sensor 291 and a self-timed sequencer circuit 292. Sensor 291 has an input for receiving a control signal, and an output for providing a digital signal representative of a sensed value to the DQ signal lines. Self-timed sequencer circuit 292 has an input connected to the output of command decoder 211 for receiving the CONTROL signal, and an output connected to the control input of sensor 291. In the illustrated embodiment, sensor circuit is a temperature sensor and is labelled "T" that outputs a multi-bit digital signal representative of temperature. In this example, sensor circuit could be implemented with a resistor whose resistance is proportional to temperature, a voltage amplifier that measures a voltage across the resistor, and an analog-to-digital converter that provides a digital signal having a value that corresponds to the magnitude of the voltage. In other embodiments, sensor 291 could be a voltage sensor that outputs a signal representative of a voltage that affects the operation of memory 200, such as a reference voltage "$V_{REF}$" or the power supply voltage. In yet other embodiments, sensor 291 could be a frequency sensor that outputs a digital signal representative of the frequency of the CK_t and CK_c signals. In any of these examples, the parameters are parameters that can vary over time and affect training values.

Self-timed sequencer circuit 292 is a circuit that is responsive to the activation of the CONTROL signal to cause temperature sensor to measure the temperature and to output it on the DQ signals.

By providing sensor circuit 290 so that it can provide a temperature measurement asynchronously, the temperature of memory 200 can be measured while the memory is in low power self-refresh mode during a memory device power state change. Once the power manager measures the temperature, it can adjust the value of the cold boot parameters according to the change in temperature and without performing a complete training (known as a "warm boot" training). In this way, power manager 151 can change memory device power states while updating training values based on the current temperature with lower latency.

FIG. 3 is a flow chart of a method 300 of operating data processing system 100 of FIG. 1 according to some embodiments. Method 300 starts at system startup 310.

At an action box 320, system BIOS 150 controls memory controller 114 and DDR PHY 115 to perform cold boot training. Cold boot training determines the "cold boot"

(default) values of several system parameters at each of a set of supported memory power states. The memory power states are defined by a frequency and a corresponding voltage that is sufficient for the memory to safely operate at that frequency. Cold boot training determines values of the parameters for each supported memory device power state and thus takes a relatively large amount of time. It is "cold" boot training in the sense that data processing system 100 and in particular the memory die may be operating near the environmental ambient temperature, i.e., before any significant integrated circuit or system heating has occurred that can affect the values of the parameters. More generally, it is cold boot training in the sense that data processing system 100 has not yet gained any particular knowledge of the DRAM, and so cold boot training could occur at any valid operating temperature. Data processing system 100 may store approximate parameter values in non-volatile memory as a starting point, but during cold boot training it acquires additional knowledge of the actual values of the parameters under the system conditions at the time it is performed.

Cold boot training can be applied to any type of memory that includes the enhanced functionality to be described further below. In one example, GDDR memory 140 of FIG. 1 is implemented with an enhanced version of GDDR6 memory. In this example, the parameters to be trained would include command/address to CK delay, write clock (WCK) to CK delay, read training (read DQ to WCK), and write training (write DQS to DQ) delay, data reference voltage offset ("VREFD"), and command and address reference voltage offset ("VREFC"). In another example, DDR memory 130 of FIG. 1 is implemented with an enhanced version of low-power DDR4 (LPDDR4) memory. In this example, the parameters to be trained would include write leveling delay, read DQS to DQ delay, write DQS to DQ delay, data reference voltage ("$V_{REF}$(DQ)") voltage, and command and address reference voltage ("$V_{REF}$(CA)"). In yet another example, DDR memory 130 of FIG. 1 is implemented with an enhanced version DDR version five (DDR5) memory. In this example, the parameters to be trained would include read DQ preamble delay, command and address (CA) to CK delay, chip select (CS) to CK delay, write DQ to CK delay (write leveling delay), data reference voltage ("VrefDQ") voltage, command and address $V_{REF}$ ("VrefDQ"), chip select reference voltage (VrefCS"), and DQ decision feedback equalizer (DFE) parameters. It should be apparent that the techniques described herein apply to these examples and to any similar memory.

In an action box 330, the trained values are stored as a particular "context". According to some embodiments, the context is defined by a set of mode registers in the memory and a set of training registers in the PHY that are active only when the memory is in the context corresponding to the memory device power state. In the example shown in FIG. 3, a first context or "CONTEXT 1" includes a set of mode registers in the memory and a set of training registers in the PHY that establish the parameters for the particular memory device power state. Thus, after the BIOS performs cold boot training, it stores the training values in the mode registers for CONTEXT 1 and causes the PHY to store the training values in training registers for CONTEXT 1.

Flow then proceeds to a sub-flow 340. Sub-flow 340 includes an action box 341 and a decision box 342. In action box 341, the power manager causes the memory controller and PHY to operate the memory in CONTEXT 1. In decision box 342, the power manager determines whether to change the memory power state. If not, then flow returns to action box 341 and the power manager causes the memory controller and PHY to operate the memory in CONTEXT 1 and. If so, then flow proceeds to a sub-flow 350.

Sub-flow 350 includes an action box 351 and a decision box 352. In action box 351, the power manager places the memory into a self-refresh mode. While the memory is in the self-refresh mode, the power manager changes the clock frequency to the frequency defined for the desired memory power state. In a decision box 352, the power manager waits for a wakeup event, for example, a determination that a sufficient amount of time has passed so that the memory clock signal has become stable at its new frequency. The power manager returns to decision box 352 until this wakeup event occurs. When it occurs, the memory controller issues a SLEEP EXIT command to the DRAM.

After the wakeup event occurs, flow proceeds to an action box 360. In action box 360, the power manager causes the memory to output a measured value of a parameter, in this example a temperature. As shown in FIG. 2, the memory has been enhanced to provide an asynchronous on-die temperature measurement in response to a SLEEP EXIT command that the power manager sends to the memory. In action box 360, the memory controller reads the temperature value and passes the value to the power manager.

In an action box 370, the power manager adjusts the cold boot training parameters for the selected power state according to the measured temperature, which will have risen above ambient temperature due to the operation of the memory heating the die. The parameters for CONTEXT 2 can then be adjusted to account for the actual operating temperature. The power manager can make these adjustments easily in firmware running on a CPU core.

In an action box 380, the power manager enables the now-stable memory clock, and before beginning normal memory read and write operations, performs mode register set commands to adjust the training values for the CONTEXT 2 registers and enable the CONTEXT 2 parameters in the PHY. In some embodiments, the power manager stores the cold boot values for each memory device power state in system memory, and uses the CONTEXT 1 and CONTEXT 2 registers to alternate between two or more memory device power states at the actual measured temperatures. For example, CONTEXT 1 may initially store the DO or highest frequency memory device power state at cold boot, but then be adjusted during operation by adjusting the cold boot parameters stored in CONTEXT 1 according to the difference between the actual temperature and the cold boot temperature. Since the power manager has kept a value of the cold boot temperature in system memory, these values can be later adjusted when the temperature changes further.

In an action box 390, the power manager issues a mode register set command to switch the context to CONTEXT 2, and then issues a self-refresh exit command to allow the memory to resume normal read and write operations using the temperature-adjusted cold boot (default) parameters for the new device power state. At this point, flow returns to action box 341.

Figure 4:
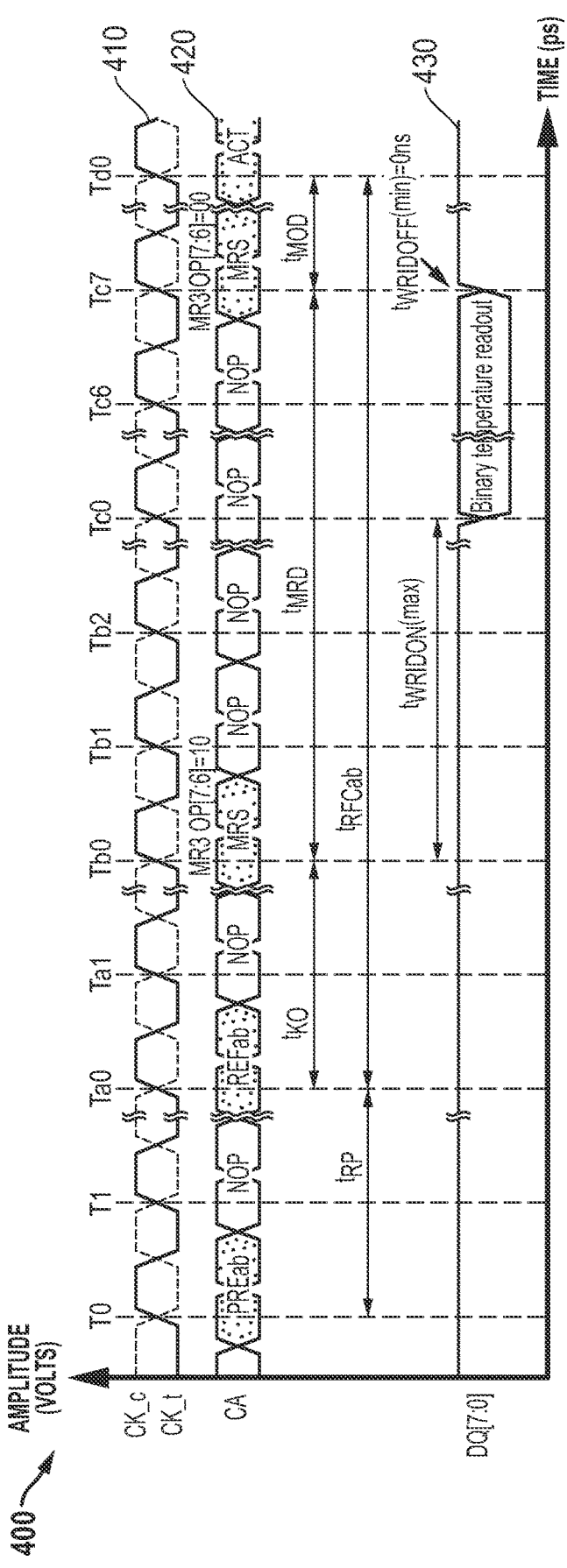
FIG. 4 is a timing diagram showing a synchronous temperature readout sequence according to the prior art.

FIG. 4 is a timing diagram 400 showing a synchronous temperature readout sequence according to the prior art. In timing diagram 400, the horizontal axis represents time in picoseconds (ps), and the vertical axis represents the amplitude of various signals in volts. Timing diagram 400 shows three waveforms of interest as well as different times of interest satisfying different timing specifications.

A waveform 410 shows a differential memory clock signal having a true component labelled "CK_t" and a complementary component labelled "CK_c", in which CK_t and CK_c are collectively referred to as the CK signal.

Shown in timing diagram 400 are rising edges of CK_t, including times T0 and T1, interrupted by an indefinite time period and followed by times Ta0 and Ta1, interrupted by another indeterminate period of time and followed by times Tb0, Tb1, Tb2, and Tc0, interrupted by six clock periods shown followed by times Tc6, and Tc7, and interrupted by yet another indeterminate period of time and followed by time Td0. A waveform 420 shows a command and address (CA) signal group various encoded commands superimposed on the waveforms. A waveform 430 shows a data signal group DQ[7:0].

Timing diagram 400 shows exemplary signal timing for a GDDR6 memory. In the GDDR6 memory, each command is encoded using two portions of the CA signals on two consecutive CK half-cycles. At time T0, the memory receives an all-bank precharge command "PREab" to put the memory into the Bank Idle state followed by a no-operation (NOP) on the CA pins. The next command cannot be issued until a row precharge delay labelled "$t_{RP}$" thereafter, which is satisfied at time Ta0. At time Ta0, the memory receives an all-bank refresh command labelled "REFab". Only NOP commands can be issued until a delay labelled "$t_{KO}$" has elapsed, which occurs at time Tb0 in which the memory returns to the Bank Idle state. At time Tb0, the memory receives a mode register set command labelled "MRS" to mode register 3 in which bits 7 and 6 are equal to "10" binary. This command is a "DRAM Info" command that initiates a temperature readout operation. The temperature readout is valid after a time labelled $t_{WRIDON}$(max)" has occurred at Tc0. At time Tc0, the memory outputs a binary temperature readout on the DQ[7:0] signal lines. The binary temperature readout is valid until time Tc7. At time Tc7, the memory receives a mode register set command to mode register 3 in which bits 7 and 6 are equal to "00" binary, resetting the DRAM Info command to "off". Subsequently at time Td0, the memory can receive an activate command (ACT) that puts the memory into the Bank Active state and allows it to receive read and write commands thereafter.

The GDDR6 temperature readout command is a synchronous command that requires the CK signal to be present. Since the training updates require the memory to be in the self-refresh mode while the CK signal is unstable, and during a power state change, the CK signal cannot be used to synchronously read the temperature.

Figure 5:
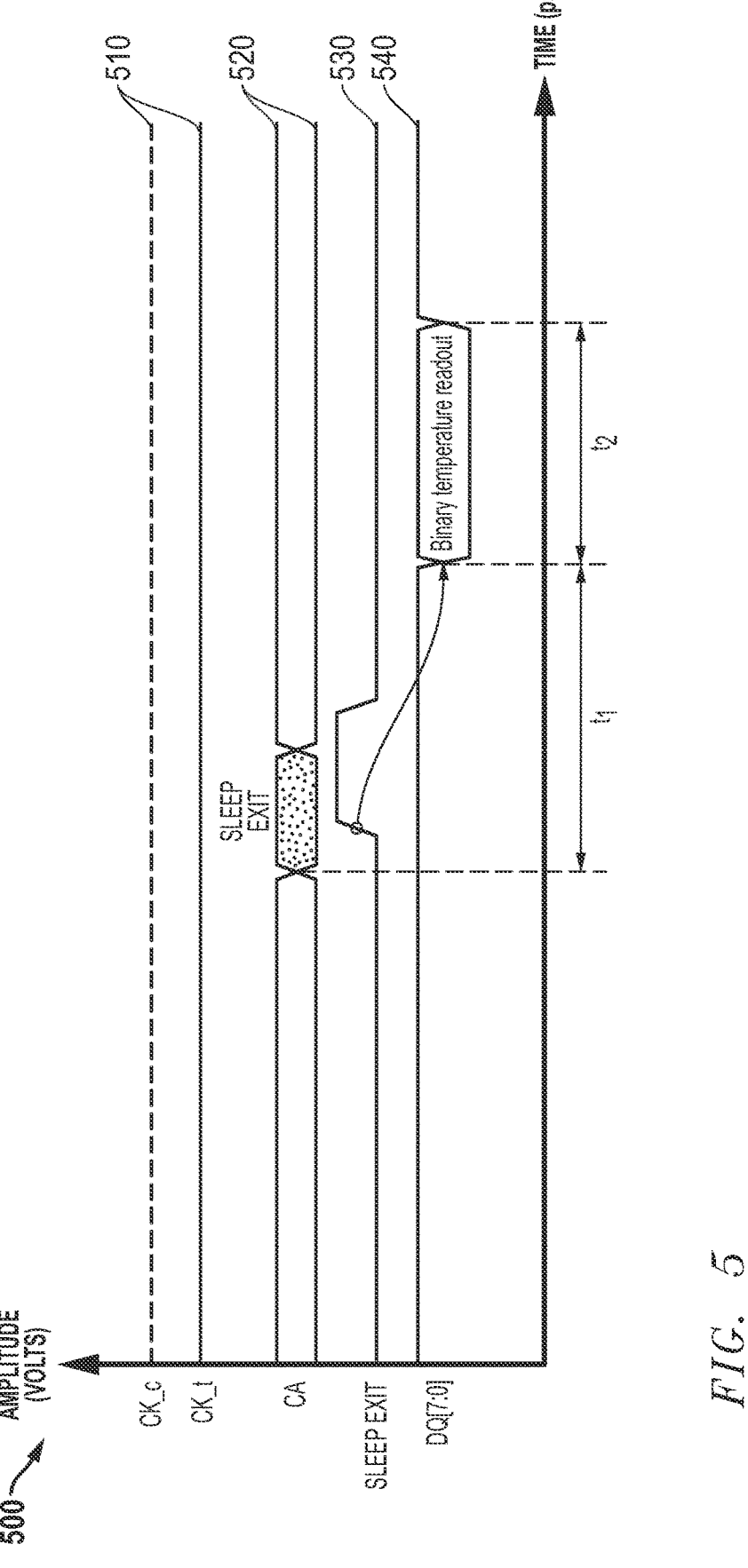
FIG. 5 is a timing diagram showing an asynchronous temperature readout sequence according to some embodiments.

FIG. 5 is a timing diagram 500 showing an asynchronous temperature readout sequence according to some embodiments. In timing diagram 500, the horizontal axis represents time in picoseconds (ps), and the vertical axis represents the amplitude of various signals in volts. Timing diagram 500 shows four signal groups of interest.

A waveform 510 shows a differential memory clock signal having a true component CK_t and a complementary component labelled CK_c, in which CK_t and CK_c are collectively referred to as the CK signal. A waveform 520 shows a CA signal group that encodes various commands superimposed on the waveforms. A waveform 530 shows a SLEEP EXIT command. A waveform 540 shows a DQ[7:0] signal group.

As shown in timing diagram 500, the CK signal has been removed, the CK_t signal is continuously driven low, and CK_c signal is driven continuously high. The CA signals are don't cares until data processor 110 encodes a SLEEP EXIT command. In response to receiving the SELLP EXIT command, command decoder 211 outputs an active-high SLEEP EXIT signal shown as waveform 530. The rising edge of the SLEEP EXIT signal causes memory 200 to output a temperature signal, shown in timing diagram 500 as a BINARY TEMP READOUT. While the operation is asynchronous, there are two timings that can be used by the memory controller PHY to capture the BINARY TEMP READOUT. The first is a time period labelled "$t_1$" which is the time from the encoding of the SLEEP EXIT command to the output of the BINARY TEMP READOUT. The second is a time period labelled "$t_2$" which represents the amount of time the BINARY TEMP READOUT remains on the DQ[7:0] pins. Thus, although asynchronous, the host memory controller and PHY uses the $t_1$ and $t_2$ parameters to determine when to capture the BINARY TEMP READOUT.

Figure 6:
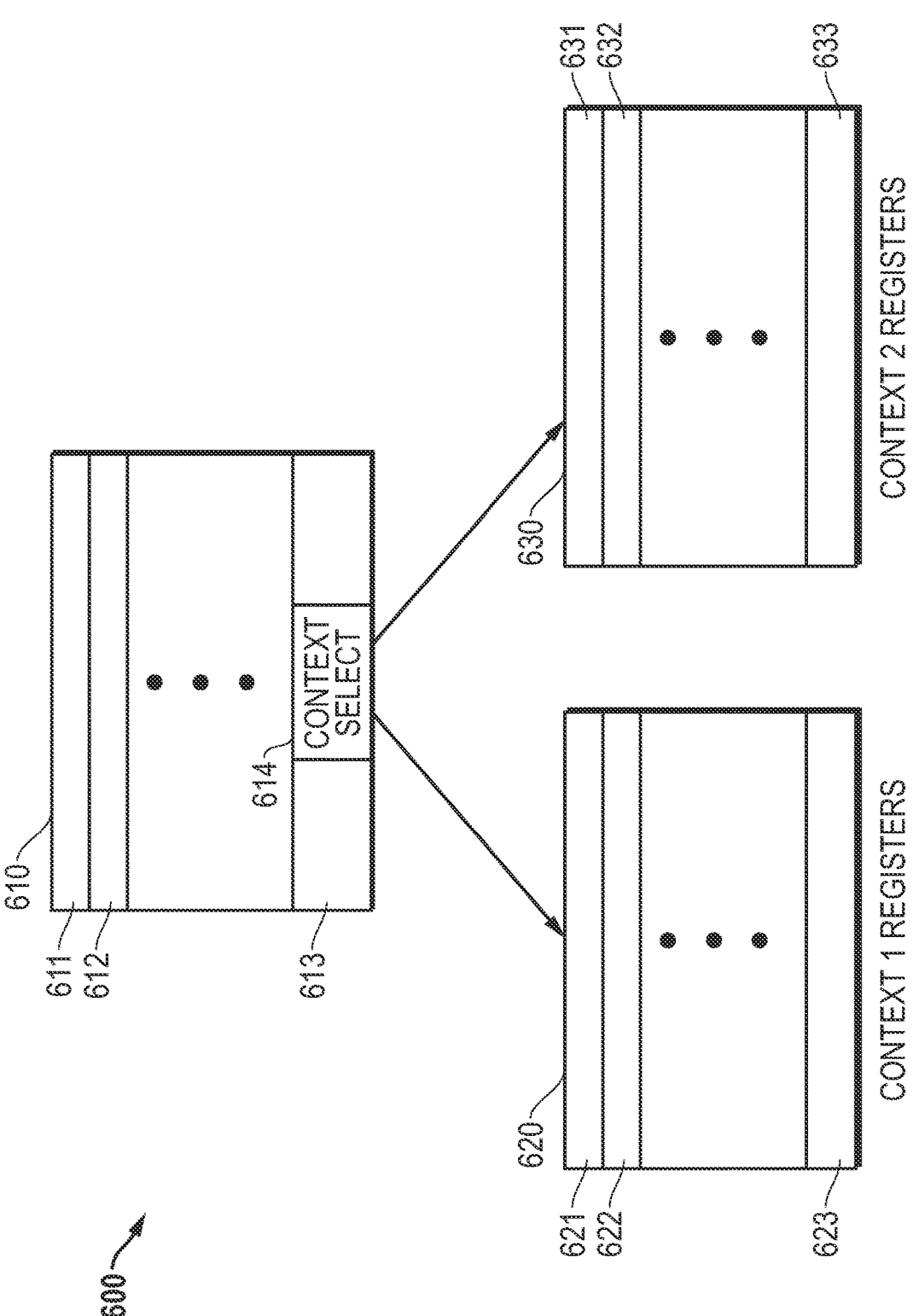
FIG. 6 illustrates in block diagram form a mode register file system that may be used as a portion of the mode registers of the memory of FIG. 1 according to some embodiments.

FIG. 6 illustrates in block diagram form a mode register file system 600 that may be used as a portion of the mode registers of the memory of FIG. 1 according to some embodiments. Mode register file system 600 includes a set of non-training related mode registers 610, a set of mode registers 620 associated with CONTEXT 1, and a second of mode registers 630 associated with CONTEXT 2.

Non-training related mode registers 610 include mode registers that are independent of the context and the memory device power state. Non-training related mode registers include representative registers 611, 612, and 613. Register 613 includes a field 614 of one or more bits labelled "CONTEXT SELECT" that are used by power manager 151 to select a current context for the memory. Mode registers 620 are associated with CONTEXT 1 and include representative registers 621, 622, and 623. Mode registers 630 are associated with CONTEXT 2 and include representative registers 631, 632, and 633.

For example, if field 614 has a value of "0" binary, it selects CONTEXT 1 registers to control the values of trained parameters, and if field 614 has a value of "1" binary, it selects CONTEXT 2 registers to control the values of trained parameters. In this way, the memory controller can program one set of registers based on the measured value, e.g., the current temperature, while the memory is still running using the other context. Then the context switch can be accomplished with a single mode register set command instead of writing the registers one at a time and increasing the latency of the memory device power state change.

In other embodiments, the CONTEXT SELECT bit can select among more than two contexts, although the usefulness of contexts greater than two will decrease significantly. Also, various parameters can be associated with a particular context, which will vary between different memory types.

While particular embodiments have been described, various modifications to these embodiments will be apparent to those skilled in the art. For example, while temperature was used as the parameter, other parameters such as power supply voltage, actual frequency of the command and address oscillator, and the like can be used to adjust the training parameters. As noted above, the technique can be used to enhance existing GDDR, DDR, and LPDDR memories, as well as other types of memory such as high bandwidth memory (HBM) and other existing and future memory types. The actual training parameters that are affected by the measured value will vary based on memory type. Moreover, the number of contexts that can be defined by which to adjust the default parameters to the current parameters can vary in other embodiments. The signals used by the memory device to output the measured value asynchronously can also vary in other embodiments.

Accordingly, it is intended by the appended claims to cover all modifications of the disclosed embodiments that fall within the scope of the disclosed embodiments.

What is claimed is:

1. A data processing system, comprising:
a data processor having a memory controller, wherein the data processor has an output for providing a clock signal; and
an integrated circuit memory coupled to the memory controller for reading and writing data synchronously with respect to the clock signal, wherein the integrated circuit memory includes a sensor circuit that is responsive to a control signal to output a measured value without using the clock signal.

2. The data processing system of claim 1, wherein the sensor circuit comprises:
a sensor; and
a self-timed sequencer circuit responsive to the control signal to activate the sensor, to cause the sensor to capture the measured value, and to cause the sensor to output the measured value on at least one external terminal of the integrated circuit memory.

3. The data processing system of claim 2, wherein the sensor comprises a temperature sensor and the measured value is a temperature of the integrated circuit memory.

4. The data processing system of claim 2, wherein the sensor comprises a voltage sensor and the measured value is a power supply voltage of the integrated circuit memory.

5. The data processing system of claim 2, wherein the sensor comprises a frequency sensor and the measured value is representative of a frequency of the clock signal.

6. The data processing system of claim 2, wherein the at least one external terminal of the integrated circuit memory comprises a plurality of data input/output terminals.

7. The data processing system of claim 1, wherein:
in response to a change in an operating point of the integrated circuit memory, the data processor places the integrated circuit memory in a low power state; and
in response to initiating an exit from the low power state, the data processor:
activates the control signal, wherein the control signal is a sleep exit signal;
reads the measured value;
adjusts at least one parameter value in response to the measured value to generate at least one adjusted parameter value;
programs the at least one adjusted parameter value in one or more mode registers of the integrated circuit memory; and
returns the integrated circuit memory to a normal operation state from the low power state.

8. The data processing system of claim 1, wherein:
the data processor adjusts at least one parameter value in response to the measured value according to a difference between the measured value and a prior measured value.

9. An integrated circuit memory, comprising:
a control logic circuit having a first input for receiving a clock signal, a second input for receiving a command signal, and an output for providing a control signal in response to a predetermined state of the second input;
a memory array;
access circuitry responsive to commands received on the second input synchronously with the clock signal to access data in the memory array; and
a sensor circuit for outputting a measured value on at least one output terminal of the integrated circuit memory in response to an activation of the control signal,
wherein the control logic circuit is responsive to the predetermined state of the second input to activate the control signal without using the clock signal.

10. The integrated circuit memory of claim 9, wherein the sensor circuit comprises:

a sensor; and a self-timed sequencer circuit responsive to the control signal to activate the sensor, to cause the sensor to capture the measured value, and to cause the sensor to output the measured value on at least one external terminal of the integrated circuit memory.

11. The integrated circuit memory of claim 10, wherein the sensor comprises a temperature sensor and the measured value is a temperature of the integrated circuit memory.

12. The integrated circuit memory of claim 10, wherein the sensor comprises a voltage sensor and the measured value is a power supply voltage of the integrated circuit memory.

13. The integrated circuit memory of claim 10, wherein the sensor comprises a frequency sensor and the measured value is representative of a frequency of the clock signal.

14. The integrated circuit memory of claim 10, wherein the at least one external terminal of the integrated circuit memory comprises a plurality of data input/output terminals.

15. The integrated circuit memory of claim 9, wherein:

the control logic circuit is responsive to a low power state entry command to place the integrated circuit memory in a low power state;

while the integrated circuit memory is in the low power state, the control logic circuit remains responsive to the predetermined state of the second input to provide the control signal without using the clock signal, wherein the control signal is a sleep exit signal; and the control logic circuit is responsive to a low power state exit command to bring the integrated circuit memory out of the low power state.

16. The integrated circuit memory of claim 9, further comprising:

a first set of mode registers, wherein the first set of mode registers stores a plurality of training values at a first value of a parameter;

a second set of mode registers corresponding to the first set of mode registers; and a register including a field for storing at least one bit to indicate whether the integrated circuit memory uses the first set of mode registers or the second set of mode registers in an operation of the integrated circuit memory.

17. A method, comprising:

determining whether a memory will enter a low power mode;

putting the memory into the low power mode comprising stopping an external clock from being provided to the memory;

detecting a wakeup event;

sensing a measured value using a sensor circuit;

adjusting a set of cold boot parameters for operating the memory according to the measured value to form current parameters; and operating the memory using the current parameters.

18. The method of claim 17, further comprising:

determining the set of cold boot parameters in response to a system startup; and initially operating the memory using the cold boot parameters before determining whether the memory will enter the low power mode.

19. The method of claim 18, wherein the adjusting comprises:

determining a difference between the measured value and a cold boot measured value corresponding to the cold boot parameters; and adjusting said cold boot parameters based on the difference between the measured value and the cold boot measured value.

20. The method of claim 19, further comprising:

storing the cold boot parameters in a first set of mode registers forming a first context; and storing the current parameters in a second set of mode registers corresponding to the first set of mode registers and forming a second context, wherein said operating comprises:

selecting the second context; and using the current parameters to operate the memory.

* * * * *